A. CHRISTIAN.
Children's Carriage.
No. 3,074. Reissued Aug. 11, 1868.
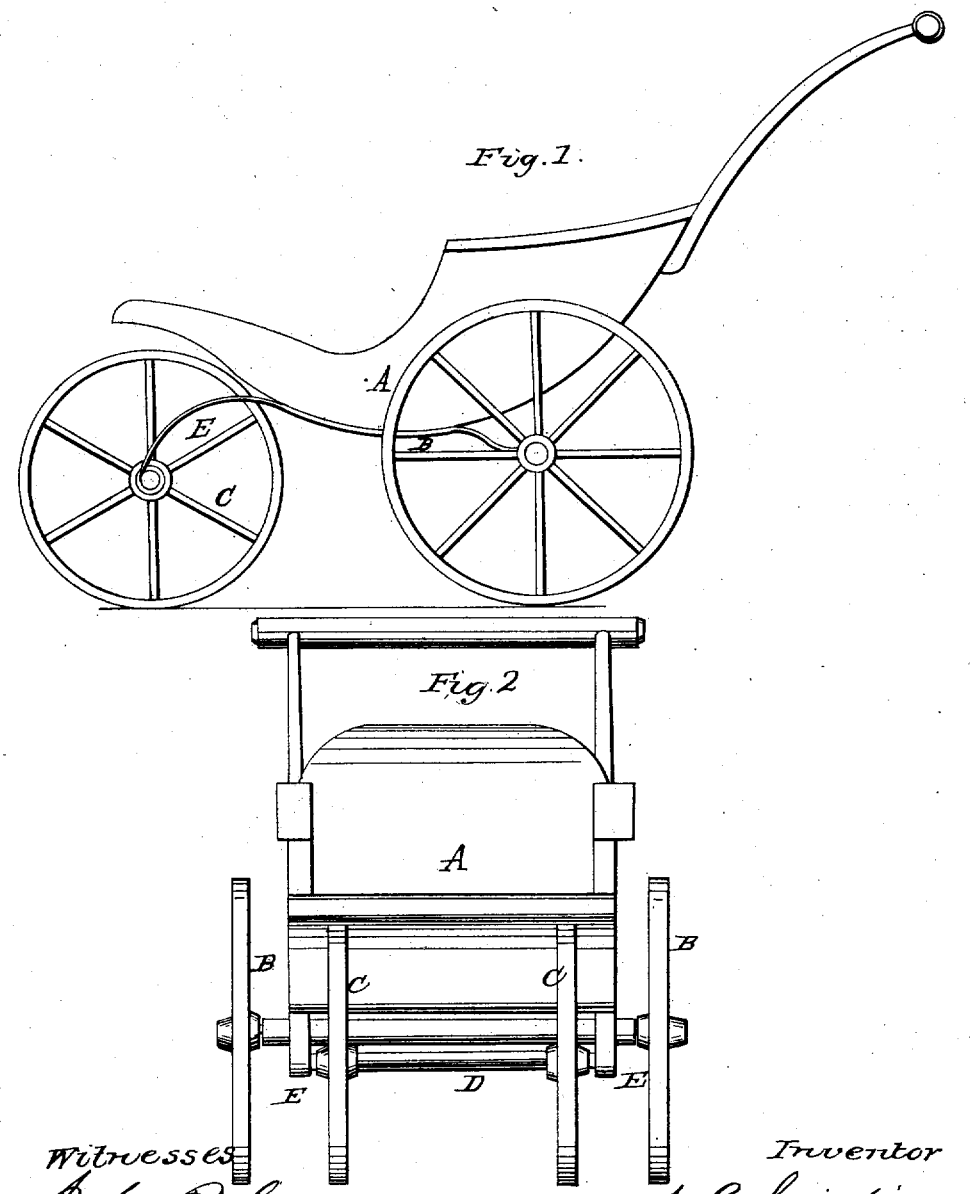
Witnesses
J. H. B. Covington
Wm. Trewin
Inventor
A. Christian
Per Munn & Co
Attorneys
N. PETERS. Photo-Lithographer, Washington, D. C.

United States Patent Office.

ANDREW CHRISTIAN, OF NEW YORK, N. Y.

*Letters Patent No.* 54,111, *dated April* 24, 1866; *reissue No.* 3,074, *dated August* 11, 1868.

IMPROVEMENT IN CHILDREN'S CARRIAGES.

The Schedule referred to in these Letters Patent and making part of the same.

TO ALL WHOM IT MAY CONCERN:

Be it known that I, ANDREW CHRISTIAN, of 81 Maiden Lane, in the city, county, and State of New York, have invented a new and useful Improvement in Children's Carriages; and I do hereby declare that the following is a full, clear, and exact description thereof, which will enable others skilled in the art to make and use the same, reference being had to the accompanying drawings, forming part of this specification.

This invention relates to that class of children's carriages commonly called "perambulators," in which the body of the carriage is set or sustained upon three wheels, two at the rear or back end, and one in front; and the present invention consists in the application of two wheels to the front axles of such carriages, and between the sills or bearings of the same, in lieu of one, as heretofore used, which two wheels are fixed or hung to the said front axle-shaft, which may be hung and turning at each end in suitable journals or bearings of the carriage-body or frame, the object being to obviate and prevent the liability of the carriage being overturned or upset in the crossing of the streets, by the raising and sustaining of the carriage upon the single front wheel, when lifting it over the curb-stone of the sidewalk.

In the accompanying plate of drawings my improvement in children's carriage is illustrated—

Figure 1 being an elevation of one side of the same, and

Figure 2 a view of the front end.

Similar letters of reference indicate like parts.

A, in the drawings, represents the body of the child's carriage, which is made of the usual or of suitable form, commonly known as "perambulators," this body being sustained by two rear wheels B B, and at its front end by two wheels C C, placed between the sills E of the carriage, upon a common axle-shaft, D they being either hung or mounted on the same.

If the front wheels are mounted on the axle D, the ends of the latter turn in suitable bearings of the carriage-body, or of some part affixed thereto, as in the present instance in the sills E E of the same.

In all cases the front wheels are to be between the sills E, so as to be no more in the way than the single wheel used to be.

By suspending the front end of the carriage upon two wheels, as above explained, it is obvious that when the rear end of the carriage is lifted sufficiently to leave the whole weight upon the front wheels only, as is always the case in the crossing of streets, it can by no possibility become upset or overturned, as a broad support or base is given to the body of the two front wheels, while heretofore it was apt to be upset, being only supported by the narrow rim of one wheel.

When the wheels C are hung on the axle D, they turn loose around the same, while the axle is fixed.

The wheels C may both be fitted on a common axle, as shown, or they may be arranged each on a separate axle, if desired.

I claim as new, and desire to secure by Letters Patent—

Supporting the front end of a children's carriage upon two wheels, arranged between the sills of the carriage, substantially as herein shown and described.

A. CHRISTIAN.

Witnesses:

A. V. BRIESEN,

ALEX. F. ROBERTS.